United States Patent
Smidt et al.

(10) Patent No.: US 6,439,808 B1
(45) Date of Patent: Aug. 27, 2002

(54) METHOD AND A DEVICE FOR PROTECTIVE ENCAPSULATION OF PIPE LOOPS INSTALLABLE ON THE SEABED

(76) Inventors: Sture Smidt, Brateng, 90, N-1515 Moss (NO); Jan-Allan Kristiansen, Skredbakka 2, N-4048 Hafrsfjord (NO)

( * ) Notice: Subject to any disclaimer, the term of this patent is extended or adjusted under 35 U.S.C. 154(b) by 0 days.

(21) Appl. No.: 09/646,842

(22) PCT Filed: Mar. 16, 1999

(86) PCT No.: PCT/NO99/00089
§ 371 (c)(1),
(2), (4) Date: Nov. 17, 2000

(87) PCT Pub. No.: WO99/50581
PCT Pub. Date: Oct. 7, 1999

(30) Foreign Application Priority Data

Mar. 27, 1998 (NO) .................................. 981391

(51) Int. Cl.[7] ................................ F16L 1/16; F16L 1/20
(52) U.S. Cl. ................... 405/172; 405/157; 405/169; 405/184.4
(58) Field of Search ................... 405/157, 158, 405/159, 172, 184.4, 154.1; 138/105, 106, 107, 108

(56) References Cited

U.S. PATENT DOCUMENTS

| 2,518,981 A | * | 8/1950 | Edwards ..................... 405/172 |
|---|---|---|---|
| 2,791,019 A | * | 5/1957 | Du Laney ..................... 405/172 |
| 3,779,027 A | | 12/1973 | Murphy |
| 3,793,845 A | * | 2/1974 | Keith ......................... 405/172 |
| 4,102,137 A | * | 7/1978 | Porraz et al. ................ 405/172 |
| 4,242,010 A | | 12/1980 | Gjerde et al. |
| 4,400,115 A | * | 8/1983 | Biancale et al. ............. 405/172 |
| 4,477,206 A | * | 10/1984 | Papetti et al. ............... 405/172 |
| 4,480,943 A | * | 11/1984 | Leuenberger ................ 405/172 |

FOREIGN PATENT DOCUMENTS

| GB | 1530894 | * | 11/1978 | .................. 405/157 |
|---|---|---|---|---|
| GB | 2 230 318 A | | 10/1990 | |
| NL | 7804372 | * | 10/1979 | .................. 405/172 |
| NO | 33674 | * | 12/1921 | .................. 405/172 |
| SU | 1317222 | * | 6/1987 | .................. 405/157 |

* cited by examiner

Primary Examiner—Heather Shackelford
Assistant Examiner—Frederick L. Lagman
(74) Attorney, Agent, or Firm—Mathews, Collins, Shepherd & McKay, P.A.

(57) ABSTRACT

A method and a device for the protective encapsulation of an oil or natural gas pipe loop within an outer jacket or cover for installation on the seabed, where the end portions of the pipe loop are coupled to an underwater structure. The protecting encapsulation of the pipe loop within the cover or outer jacket is performed on the surface and the pipe loop is lowered, substantially completely protected, to an installation position. On the seabed, the outer jacket or cover in which the pipe loop is confined may be covered with a layer of chippings.

7 Claims, 3 Drawing Sheets

METHOD AND A DEVICE FOR PROTECTIVE ENCAPSULATION OF PIPE LOOPS INSTALLABLE ON THE SEABED

BACKGROUND OF THE INVENTION

1. Field of the Invention

The present invention relates to a method for protective encapsulation of pipe loops installable on the seabed or one or more parts of pipes or pipelines, respectively, in the need of local protection against external loads, such as falling loads, trawl appliances drawn laterally across the pipe loop or the pipeline, as well as to counteract that sand and gravel mass beneath the pipe is being washed out, said pipe loop or other pipe being intended to convey oil and/or gas which can give rise to partly large temperature variations, and following expansion and contraction phenomena, and wherein the pipe loop or other pipe during the installation is lowered down from surface position, and wherein the pipe loop or other pipe in operative position of use on the seabed is surrounded by a protective cover which, preferably, in a final operation, is covered by a layer of chippings, or is kept in position in another, not specified way, e.g. by means of anchors.

Likewise, the invention relates to a device for protective encapsulation of a pipe loop or other pipe for the same general purpose, comprising a protective cover, possibly consisting of a number of joinable sections, jointly corresponding to the length of the pipe loop and shaped and designed in order to accommodate and surround a correspondingly long pipe portion.

Said protective cover or cover section, respectively, may have a closed, locally perforated, e.g. triangular cross-section with rounded corners and a flat floor-space/bottom wall to be placed against the seabed surface and which, internally, does not counteract the extensions and contractions of the pipe due to temperature alternations. Seabed-installed pipes and pipelines conveying gas and/or oil may vary to such a degree that the pipe will have to lengthen/shorten itself e.g. two metres at each end. A temperature of up to 110° C. is an adequate example associated with oil and/or gas temperature when conveyed in pipes along the seabed.

2. Background

Pipe loops of this kind extend usually between underwater structures, but the protection method and device, respectively, according to the invention may as advantageously be used for pipe or local pipe sections of similar kind.

In such cases, in accordance with prior art technique, a pipe loop is first lowered down by means of a so called yoke, a kind of elongate boom insignificantly exceeding the shortest distance between the outer ends of the pipe loop, the pipe loop being attached to the boom, fixing means being fastened to the boom for the lowering operation. After the pipe loop's lowering and positioning on the seabed, a protective cover is mounted around the pipe by means of divers and/or underwater vessels. Thereafter, a further vessel will provide covering of the pipe loop included within the protective cover, with chippings.

Known and conventional technique is very time-consuming and expensive.

BRIEF SUMMARY OF THE INVENTION

The object of the invention has been, with simple and cheap means, to indicate a method and provide a device for protective encapsulation of a pipe loop or other pipe installable on the seabed, wherein the installation of the pipe, from the installation starts until the pipe rests on the seabed in protected condition, can be carried out in a considerable shorter time and with fewer vessels than before.

The object is achieved by proceeding in accordance with the characterizing clause of the first method claim. The first apparatus claim defines a suitable device for carrying out this method.

According to the invention, the protective cover is mounted on the pipe loop or other pipe in surface position, for, thereupon, to be lowered down to the installation place on the seabed from a surface vessel in at least partly protected condition.

This step involves that one can not only perform encapsulation of the pipe loop within the protective cover/jacket above water (on the place of production) instead of on the seabed and, thus, perform the necessary working operation on a far more convenient place where, moreover, the working conditions may be arranged optimally for the particular operations; besides this, the significant advantage is achieved that the required fasteners for the lowering-down wires from the surface vessel now may be provided on or attached to, respectively, the protective cover/jacket or the joined sections thereof, respectively. This results in that lowering of a pipe loop does not require the previously usual, very elongate yoke, and one is spared from releasing the pipe loop from the yoke at seabed level.

When the pipe loop thusly encapsulated within the protective cover has come into position on the seabed and each of its two ends has been coupled to a underwater structure belonging thereto, one can, if desired or necessary, place a layer of chippings on top of the protective cover with the pipe loop encapsulated therein. For example this can be desirable in fairway where bottom trawl fishing is usual. The layer of chippings will usually acquire the shape of an approximately triangular cross-section with a rounded top, and a bottom trawl will readily cross such a hindrance without getting entangled therein and without damaging or displacing the cover with the therein positioned, freely expanding/contracting pipe loop.

The protective cover surrounds the pipe with a clearance, and this clearance may, at least partly, advantageously be utilised for the filling of insulation material. Oil which becomes stationary within the pipe during a brief stoppage, will, thus, be insulated against cooling and solidification, so that these undesired states are delayed. Further heating may take place by installing heating pipes directly on the pipe loop.

In the cover or in one or more cover sections, respectively, in the bottom wall, through-going holes may be formed in order to, during the installation of cover/jacket with encapsulated pipe, be capable of letting seawater into the space between the outside of the pipe and said insulation's inside.

Hoisting means in the form of fasteners on cover and, possibly, on pipe loop may consist of attachment armatures in steel and/or soft hoisting straps for wire. Fasteners on the pipe loop are, preferably, releasable, so that they can be removed when the pipe loop included within the protective cover has arrived into position on the seabed and the ends thereof each has been coupled to an underwater structure belonging thereto. Prior to such a coupling operation, cover and pipe loop are releasably attached to each other, so that pipe loop and cover become mounted in correct positions in relation to each other. Subsequently to the pipe loop's interconnection between the structures, the connection between cover and pipe loop is released.

BRIEF DESCRIPTION OF THE DRAWINGS

The method and the device according to the invention is further explained in the following, reference being made to accompanying drawings, in which.

DETAILED DESCRIPTION OF THE DRAWINGS

Figure 1:
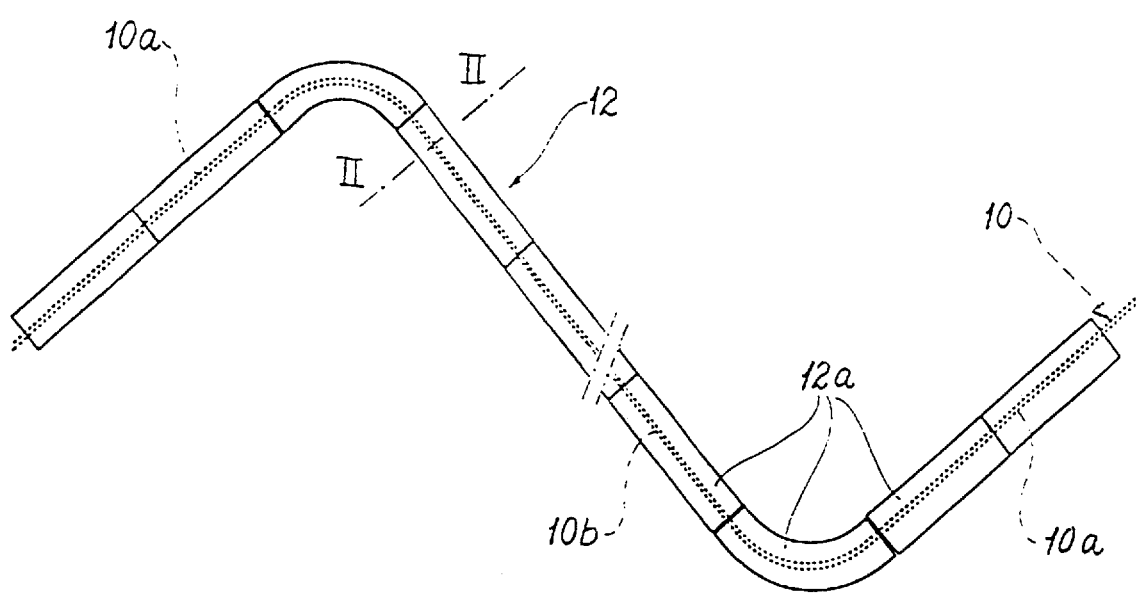
FIG. 1 in a top plan view illustrates the typical course of a pipe loop encapsulated within an external jacket consisting of a plurality of joined cover sections, and wherein the ends thereof each is intended to be coupled to an underwater structure (not shown) belonging thereto, in a manner known per se.

First, reference is made to the general view of FIG. 1 where a dotted pipe loop 10 which may have an arbitrary course, here is shown to comprise two angled end portions 10$a$ and a long, straight, intermediate portion 10$b$.

The pipe loop 10 is, in a surface position, encapsulated within an external cover/jacket 12 consisting of a number of straight and curved sections 12$a$ joined together in a way not specifically indicated, e.g. by means of annular, outwardly directed flanges, wherein adjacent flanges have aligned bolt holes for interconnecting bolts or equal attachment means.

The advantage of encapsulating such a pipe loop or another pipe or pipe portion to be mounted on the seabed and, possibly, coupled to underwater structures (not shown), is not only the possibility of working under significantly more controllable conditions which readily may be arranged for suitable implementation; it is also advantageous that the encapsulated pipe no longer will need the previously described bracing yoke carrying attachment armatures for the fastening of hoisting wire for the pipe loop's lowering from the surface down to the seabed, and to which the pipe loop must be fixed prior to said lowering operation and released from subsequently to its landing on the seabed. Hoisting of the yoke represents a further working operation which now is facilitated.

Figure 2:
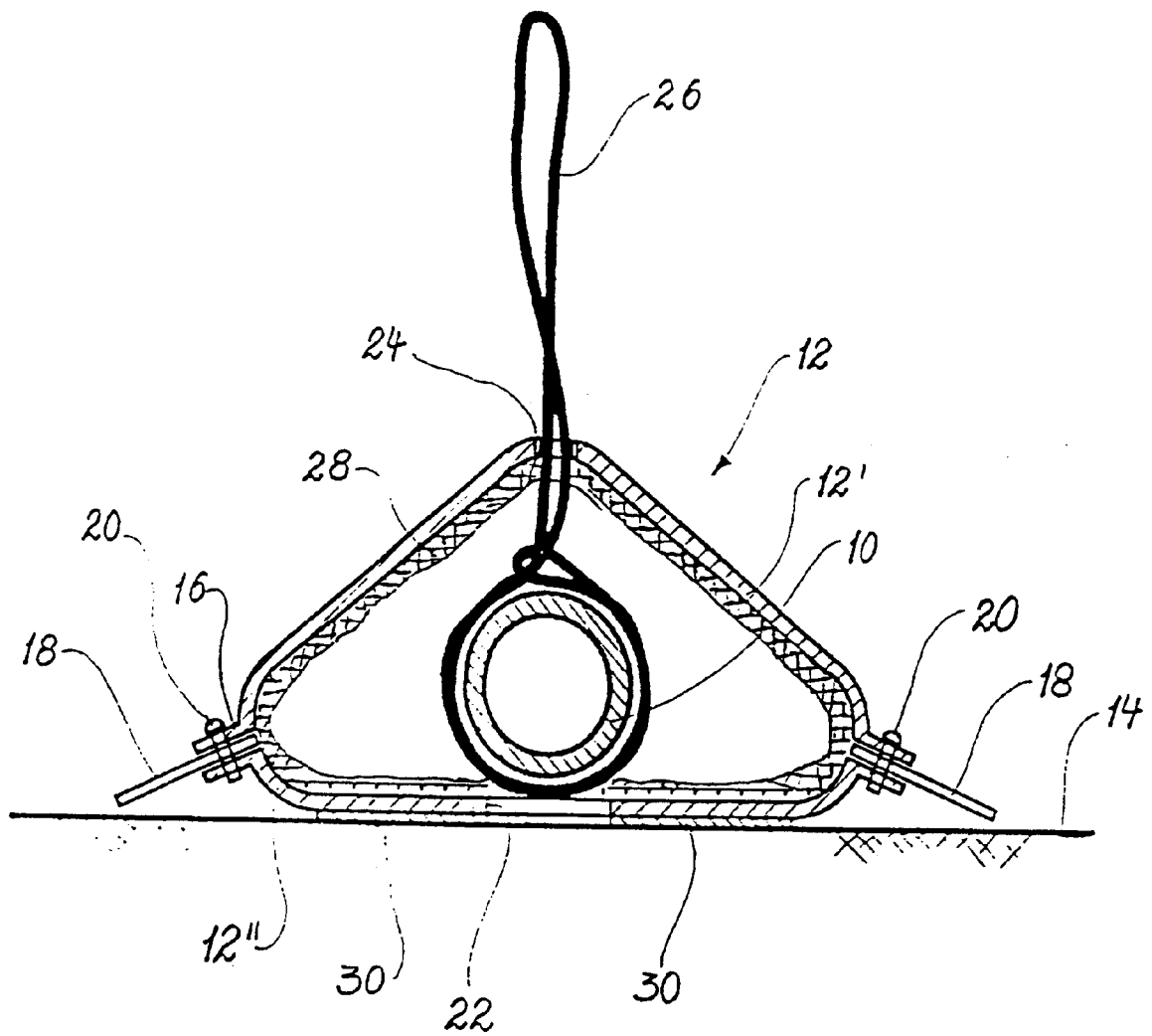
FIG. 2 is a cross-sectional view along the line II—II in FIG. 1 through the uppermost seabed layer, the cover according to a first embodiment, as well as the pipe.

With a pipe loop encapsulated within said cover or jacket, the latter will stabilise the pipe loop during the lowering thereof and will carry attachment armatures for hoisting wires. Alternatively, at certain intervals along the longitudinal extent of the pipe loop, the loop may be equipped with fasteners, e.g. in the form of lifting straps placed around the pipe. For the description of details of the pipe loop-encapsulating outer protective cover/jacket 12, reference is now made to FIG. 2, showing a cross-section (II—II in FIG. 1) of a first embodiment of a cover.

Here, seabed level is denoted at reference numeral 14.

In this embodiment, the cover/jacket 12 (more exactly its individual, joinable sections 12$a$) is formed in two parts 12', 12" divided along a longitudinal plane of division. The top part 12' has an angled (inverse V-shaped) cross-section having an obtuse top angle, and both top and bottom part are outermost terminated by angled, perforated flange portions 16 which, therebetween, accommodate slopingly downwardly directed plates 18, through-going bolts 20 locking flange portions 16 to each other, simultaneously as they clamp the inclined plates 18 firmly between the flange portions 16. The inclined plates 18 are intended to counteract excavation of mass beneath the cover 12. Length and shape thereof may vary in accordance with bottom conditions and need.

In the bottom part 12", holes 22 are provided in order to let in seawater during the installation of the cover/jacket and the therewithin encapsulated pipe loop 10, the top part 12' being formed with a central aperture 24, which serves partly to let out air as it is displaced from the cavity by seawater through the hole 22, partly as passage for a lifting strap 26, which is placed directly around the pipe 10. On the top part 12' of the cover, external attachment armatures may be mounted in the upper portion thereof, for the fastening of one or more hoisting and lowering wires (not shown). Of course, also the lifting strap 26 will be attached to such a wire.

Internally, within the cover/jacket 12, insulation material 28 has been placed, with the purpose of thermically insulating the fluid, e.g. oil, being conveved through the pipe loop, so that the oil temperature is not reduced so rapidly during a brief stoppage that the oil solidifies.

On the underside of the bottom part 12" of the cover/jacket 12, plate-shaped weight elements 30 may be attached, constituting sinker and/or stabilisation.

Figure 3:
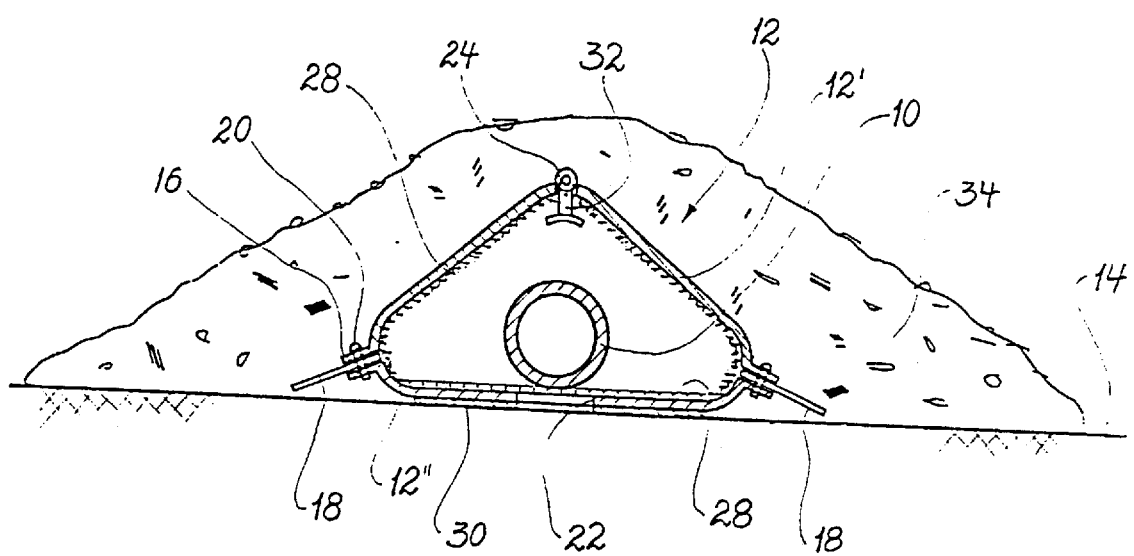
FIG. 3 shows a cross-section corresponding to FIG. 2, wherein the cover is of second embodiment, a layer of chippings being placed on top of the external jacket.

The embodiment in FIG. 3 is very much like the one shown in FIG. 2, and mutually identical parts and portions are allotted the same reference numerals. Only parts differing from those of the embodiment according to FIG. 2 will be described in addition to immediately adjacent portions.

In the embodiment shown in FIG. 3, the pipe loop 10 is not assigned any lifting straps. Instead, the top part 12' of the cover/jacket 12 is equipped with an upper, centrally placed hoisting means 32 displaceable up and down in a central aperture 24 in the top part 12'. The hoisting means has an upper fastener in the form of an eye or a ring and a lower stop, the upper curvature thereof being complementary to the internal, downwardly facing curvature of the top part 12' in the area around the central aperture 24. When lowering wires (not shown) in surface position are attached to the fasteners of the hoisting means 32, these are first drawn upwardly until their lower stops come to rest against the underside in the area for the central aperture 24 of the top part 12', whereupon the lowering of cover 12 with pipe loop 10 encapsulated therein may be carried out by means of the wires. Also, fixed lifting ears in the cover may be used.

When cover/jacket 12 with pipe loop positioned therein, but with projecting outer end portions each intended to be coupled to an underwater structure, is installed on the seabed 14, it will be advantageous to cover the cover/jacket 12 with a layer of chippings 34 or similar stone material.

Between the insulation layer 28 in the cover/jacket and the pipe's 10 external shell face, a redundant clearance suitably exists. The inner, upwardly facing surface of the bottom part's 12" insulation layer 28 has, preferably, a plane course, so that it does not counteract the possible longitudinal expansion/contraction movements of the pipe loop.

What is claimed is:

1. A method for protective encapsulation of pipe loops (10) or one or more parts of pipe or pipelines, respectively, installable on the seabed (14) and of the kind needing local protection against external loads, such as falling loads, bottom trawl equipments, etc., and for, possibly, counteracting washing out of mass from beneath the pipe (10), particularly pipe loops (10), etc., serving to convey oil and/or gas which may introduce large temperature variations into the system, accompanied by expansion/contraction phenomena, the method comprising:

encapsulating the pipe loop (10) within a protective jacket/cover joined together of joined longitudinal sections (12a) wherein the pipe loop (10) or similar pipe/pipeline is encapsulated within the jacket/cover (12) in a surface position, the jacket/cover (10) being equipped with fasteners (32) for a hoisting and/or lowering wire; and lowering the encapsulated pipe loop (10) to the seabed (14), where the outer ends of the pipe loop (10) are coupled to any underwater structures, whereupon the cover/jacket (12) with the pipe loop (10) confined therein, is covered with chippings (34).

2. A device for protective encapsulation of a pipe loop, comprising a jacket/cover (12) consisting of joined/joinable, longitudinal sections (12a) shaped to surround a pipe loop (10) or similar pipe/pipeline with a clearance therebetween,. characterized in that the jacket/cover (12) or each of the longitudinal sections (12a) thereof, respectively, is divided into at least two parts, a top part (12') and a bottom part (12") which are joinable, through flange portions (16) and bolt connections (20) wherein the bottom part (12") substantially exhibits a supporting face for the pipe loop (10), the top part (12') having an arched or polygonal cross-section, convexly curved in an upward direction.

3. The device as set forth in claim 2, characterized in that the cover/jacket (12) or each of the sections (12a) thereof, respectively, is provided with an internal insulation layer (28).

4. The device as set forth in claim 2, characterized in that the cover/jacket or each of the sections thereof, laterally is provided with at least one laterally slopingly downwardly directed plate-like element mounted to the respective jacket/cover section through the co-operating flange portions (16) and bolt connections (20) of the top part (12') and the bottom part (12").

5. A device for the protective encapsulation of a pipe loop, comprising:

a cover/jacket (12), having an inner, side consisting of joined/joinable longitudinal sections (12a) shaped to surround a pipe loop (10) or similar pipe/pipeline with a clearance therebetween, wherein the cover/jacket (12) or each of the longitudinal sections (12a) thereof, respectively, is divided into at least two parts, a top part (12') and a bottom part (12") which are joinable, through flange portions (16) and bolt connections (20) wherein the bottom part (12") substantially exhibits a supporting face for the pipe loop (10), and the top part (12') having an arched or polygonal cross-section, curved in an upward direction; and at least one hole (22) in the bottom part (12") of at least one cover/jacket section (12a), in order to let seawater into the space between the pipe loop (10) and the inner side of the cover/jacket (12) during the installation, and that the top part (12') is formed with a central aperture (24), through which air displaced by water flowing in, can escape.

6. The device as set forth in claim 5, wherein a hoisting strap (26) placed around the circumference of the pipe loop can pass through the central aperture and serve as a fastener for a lowering wire for lowering the cover/jacket (12) with the pipe loop confined therein from surface position to seabed (14).

7. The device as set forth in claim 5, having a hoisting means (32) with a fastener for a lowering wire wherein the hoisting means is displaceable supported in the central aperture (24).

\* \* \* \* \*